(12) United States Patent
Anderson et al.

(10) Patent No.: US 8,311,380 B2
(45) Date of Patent: Nov. 13, 2012

(54) SPRING-LOADED SPLICE TRAY HOLDER

(75) Inventors: Steve Anderson, Shakopee, MN (US); Soutsada Vongseng, Chanhassen, MN (US); Oscar Fernando Bran de León, Belle Plaine, MN (US); John Stasny, Lake Elmo, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 217 days.

(21) Appl. No.: 12/829,143

(22) Filed: Jul. 1, 2010

(65) Prior Publication Data

US 2010/0266254 A1 Oct. 21, 2010

Related U.S. Application Data

(62) Division of application No. 12/256,804, filed on Oct. 23, 2008, now Pat. No. 7,751,673.

(60) Provisional application No. 60/983,021, filed on Oct. 26, 2007.

(51) Int. Cl.
*G02B 6/00* (2006.01)
(52) U.S. Cl. ........................ 385/135; 385/147
(58) Field of Classification Search .................. 385/100, 385/135–139, 147
See application file for complete search history.

(56) References Cited

U.S. PATENT DOCUMENTS

| | | | |
|---|---|---|---|
| 4,765,710 A | | 8/1988 | Burmeister et al. |
| 5,100,221 A | * | 3/1992 | Carney et al. .................. 385/135 |
| 5,208,893 A | * | 5/1993 | McCall et al. ................. 385/135 |
| 6,215,938 B1 | | 4/2001 | Reitmeier et al. |
| 6,480,660 B1 | * | 11/2002 | Reitmeier et al. ............. 385/135 |
| 6,504,988 B1 | | 1/2003 | Trebesch et al. |
| 6,625,374 B2 | | 9/2003 | Holman et al. |
| 6,915,059 B2 | * | 7/2005 | Daoud et al. .................. 385/135 |
| 7,149,398 B2 | * | 12/2006 | Solheid et al. ................. 385/135 |
| 7,751,673 B2 | | 7/2010 | Anderson et al. |
| 2007/0172192 A1 | | 7/2007 | Smrha et al. |

FOREIGN PATENT DOCUMENTS

| | | |
|---|---|---|
| DE | 37 04 560 A1 | 8/1988 |
| DE | 41 32 519 A1 | 4/1993 |
| WO | WO 90/06531 | 6/1990 |
| WO | WO 00/17693 | 3/2000 |

* cited by examiner

*Primary Examiner* — Akm Enayet Ullah
(74) *Attorney, Agent, or Firm* — Merchant & Gould P.C.

(57) ABSTRACT

A splice tray holder includes a body with a first portion, a second portion, and a front surface. A retention portion is disposed on an outer periphery of each of the first and second portions and defines a receiving groove having an inner surface that faces toward the front surface of the body. A spring portion is disposed on each of the first and second portions, wherein the spring portion is adapted to provide a biasing force in a direction from the front surface of the body toward the inner surface of the receiving groove.

10 Claims, 9 Drawing Sheets

SPRING-LOADED SPLICE TRAY HOLDER

CROSS REFERENCE TO RELATED APPLICATIONS

This application is a divisional of U.S. patent application Ser. No. 12/256,804, entitled "Splice Tray Holder", filed on Oct. 23, 2008, now U.S. Pat. No. 7,751,673, issued Jul. 6, 2010, which claims the benefit of U.S. Provisional Patent Application Ser. No. 60/983,021, filed Oct. 26, 2007, the disclosures of which are hereby incorporated by reference in their entirety.

TECHNICAL FIELD

The present disclosure relates to a communication system in which signals are carried through cables such as optical fibers, and more particularly, to a cable storage container.

BACKGROUND

The telecommunications industry is rapidly proceeding with the development and installation of fiber optic cable network systems. Included within these fiber optic cable network systems are a plurality of fiber optic cables and network cabinetry. Such cabinetry can include structure for holding excess lengths of fiber optic cables as well as providing various functions for the fiber optic cables, such as splicing for joining two fiber optic cables.

While cabinetry that stores excess length of fiber optic cables and provides functions such as splicing exists, there exists a current need for such cabinetry to provide compact and secure organization of fiber optic cables.

SUMMARY

An aspect of the present disclosure relates to a splice tray holder having a body with a first portion, a second portion, and a front surface. A retention portion is disposed on an outer periphery of each of the first and second portions and defines a receiving groove having an inner surface that faces toward the front surface of the body. A spring portion is disposed on each of the first and second portions, wherein the spring portion is adapted to provide a biasing force in a direction from the front surface of the body toward the inner surface of the receiving groove.

Another aspect of the present disclosure relates to a cable storage system. The cable storage system includes a chassis, at least one splice tray holder, and at least one splice tray. The splice tray holder includes a body with a first portion, a second portion and a retention portion disposed on each of the first and second portions. The splice tray holder is pivotally connected to the chassis. The splice tray includes a tray base having a first surface and a second surface with a plurality of splice holders disposed on the first surface of the tray base. The splice tray is selectively frictionally engaged with the retention portion of the splice tray holder.

Another aspect of the present disclosure relates to a method of inserting a splice tray holder into a chassis comprising the steps of inserting a first member of a mount disposed on a splice tray holder into a first mount opening in a first rail of a bracket disposed on a chassis. A key on the first member is aligned with a notch in the first mount opening. The splice tray holder is lifted toward the first rail such that the key passes through the notch in the first mount opening. A second member of the mount is aligned with a second mount opening in a second rail of the bracket and the splice tray is lowered so as to engage the second member of the mount with the second mount opening.

Another aspect of the present disclosure relates to a cable storage system having a chassis and at least one splice tray holder, which is pivotally engaged with the chassis. The splice tray holder includes a body with a first portion and a second portion. A retention portion is disposed on each of the first and second portions. A spring portion is disposed on each of the first and second portions.

Another aspect of the present disclosure relates to a method of inserting a splice tray into a splice tray holder. The method includes aligning an outer edge of a splice tray with a receiving groove of a retention portion of a splice tray holder. The outer edge of the splice tray is inserted into the receiving groove of the splice tray holder such that a spring portion of the splice tray holder biases the splice tray toward a surface of the receiving groove. The splice tray is advanced in the splice tray holder.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
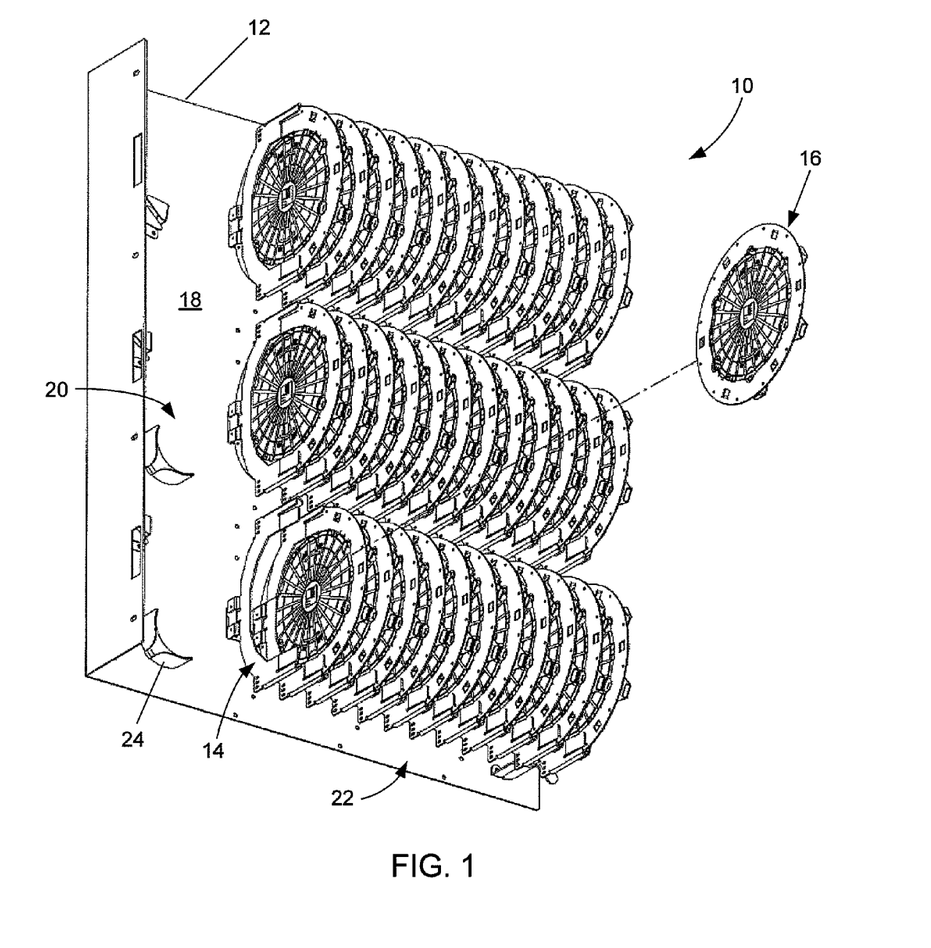
FIG. 1 is a perspective view of a cable storage system having features that are examples of aspects in accordance with the principles of the present disclosure.

Referring now to FIG. 1, a cable storage system, generally designated 10, is shown. The cable storage system 10 includes a chassis 12 and at least one splice tray holder, generally designated 14, with is adapted to receive a splice tray, generally designated 16.

While the chassis 12 is shown as a tray, it will be understood that the scope of the present disclosure is not limited to the chassis 12 being a tray as the chassis 12 could have various configurations, including but not limited to a drawer. In the subject embodiment, the chassis 12 includes a base 18. The base 18 defines a cable management region 20 and a splice tray region 22.

The cable management region 20 includes a plurality of bend radius protectors 24. In the subject embodiment, the bend radius protectors 24 are mounted to the base 18. The bend radius protectors 24 have a radius that is larger than the minimum bend radius of a fiber optic cable. The larger radius of the bend radius protectors 24 allows the fiber optic cable to be routed around the bend radius protectors 24 to the splice tray region 22 without incurring damage (e.g., attenuation losses) caused from bending the fiber optic cable beyond the minimum bend radius of the fiber optic cable.

The splice tray region 22 includes a plurality of splice tray holders 14. The splice tray holders 14 are connectedly engaged with the base 18 of the chassis 12. In the subject embodiment, the splice tray holders 14 are arranged in a plurality of rows.

In the subject embodiment, and by way of example only, there are three rows of splice tray holders 14 with twelve splice tray holders 14 per row.

Figure 2:
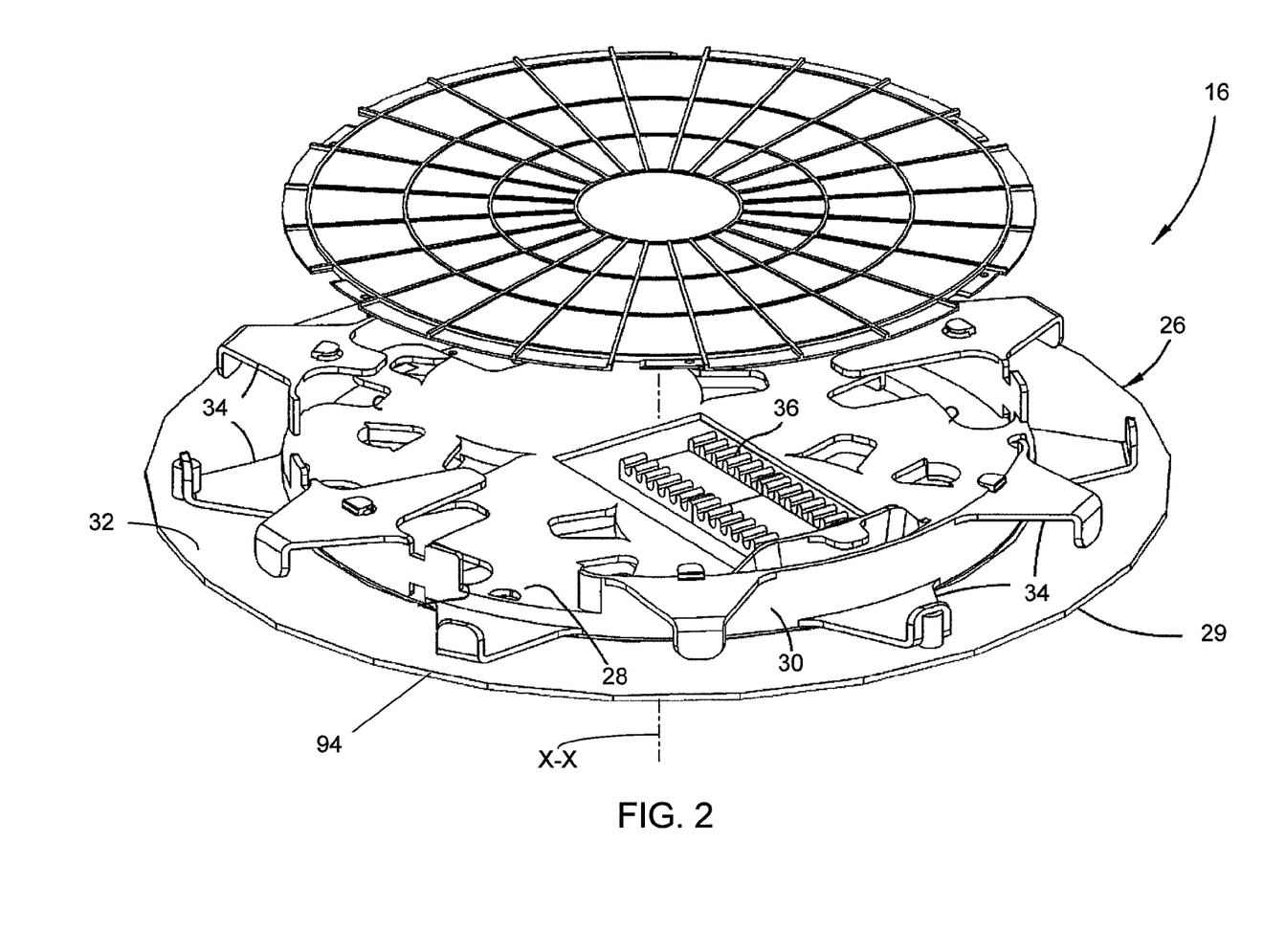
FIG. 2 is a perspective view of a splice tray suitable for use in the cable storage system of FIG. 1.

Referring now to FIG. 2, an exemplary embodiment of the splice tray 16 is shown. The splice tray 16 has been described in U.S. Pat. No. 6,215,938, which is titled "Fiber Optic Cabinet and Tray" and hereby incorporated by reference in its entirety. In the subject embodiment, the splice tray 16 includes a tray base 26 that is generally flat, planar, and circular. The tray base 26 includes a first surface 28 and an oppositely disposed second surface 29. A spool 30 is disposed on the first surface 28 of the tray base 26. The spool 30 includes portions of a cylindrical wall with an outer surface of the spool 30 defining a first fiber pathway guide spaced inwardly from a peripheral edge portion 32 of the tray base 26. The spool 30 further includes retaining clips 34 that project radially outward from the spool 30. The retaining clips 34 secure the fiber optic cables within the first fiber pathway guide. Positioned on the tray base 26 and contained within an interior of the spool 30 are splice holders 36.

Figure 3:
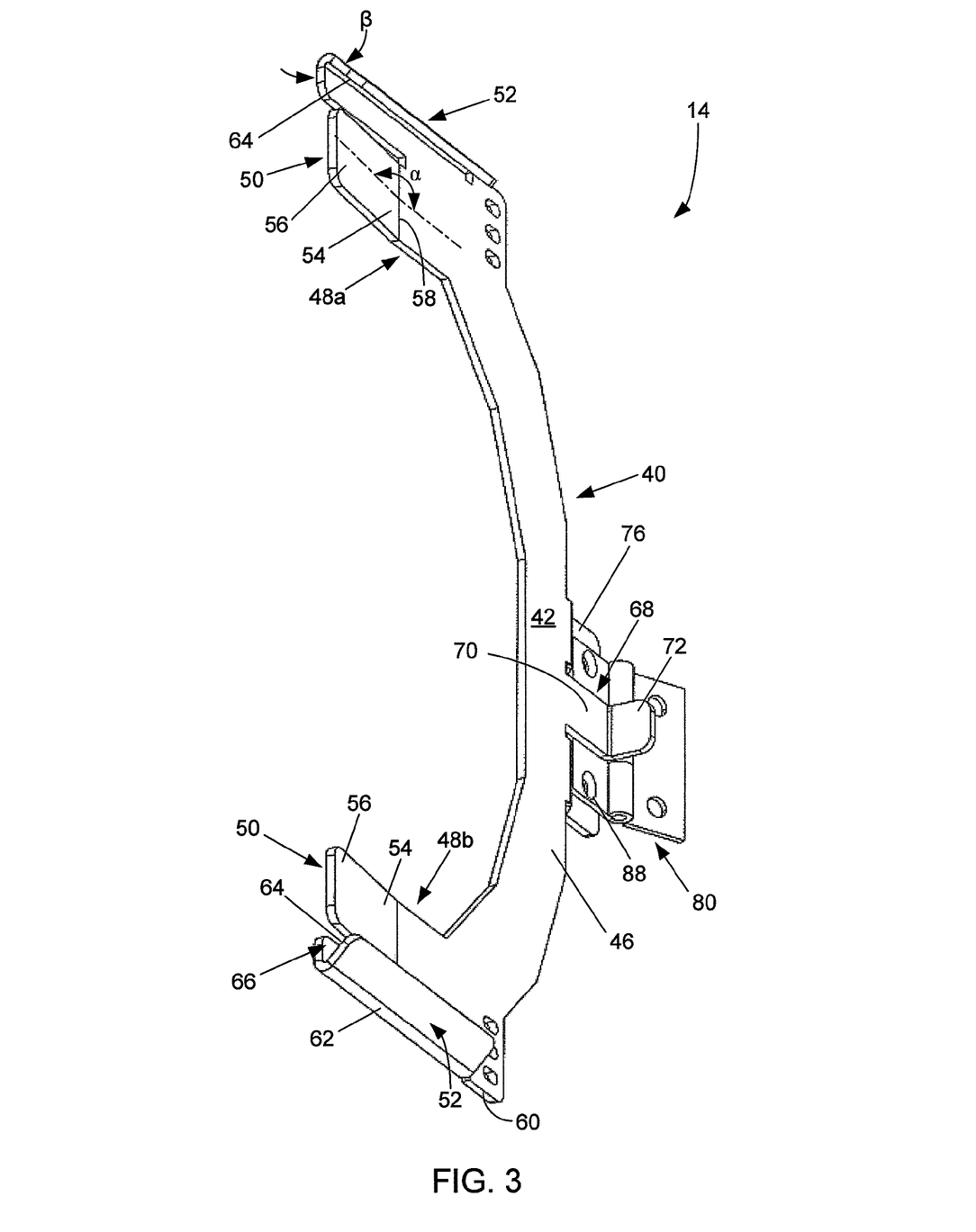
FIG. 3 is a perspective view of a splice tray holder having features that are examples of aspects in accordance with the principles of the present disclosure.

Referring now to FIG. 3, an exemplary embodiment of the splice tray holder 14 is shown. It will be understood that directional references (i.e., front, back, forward, rearward, etc.) that are used to describe the exemplary embodiment of the splice tray holder 14 are made with regard to the orientation shown in FIG. 3. Such directional references are not intended to be limiting.

In the subject embodiment, the splice tray holder 14 is manufactured from aluminum. However, it will be understood that the scope of the present disclosure is not limited to the splice tray holder 14 being aluminum as various materials could be used, including but not limited to plastics.

Figure 4:
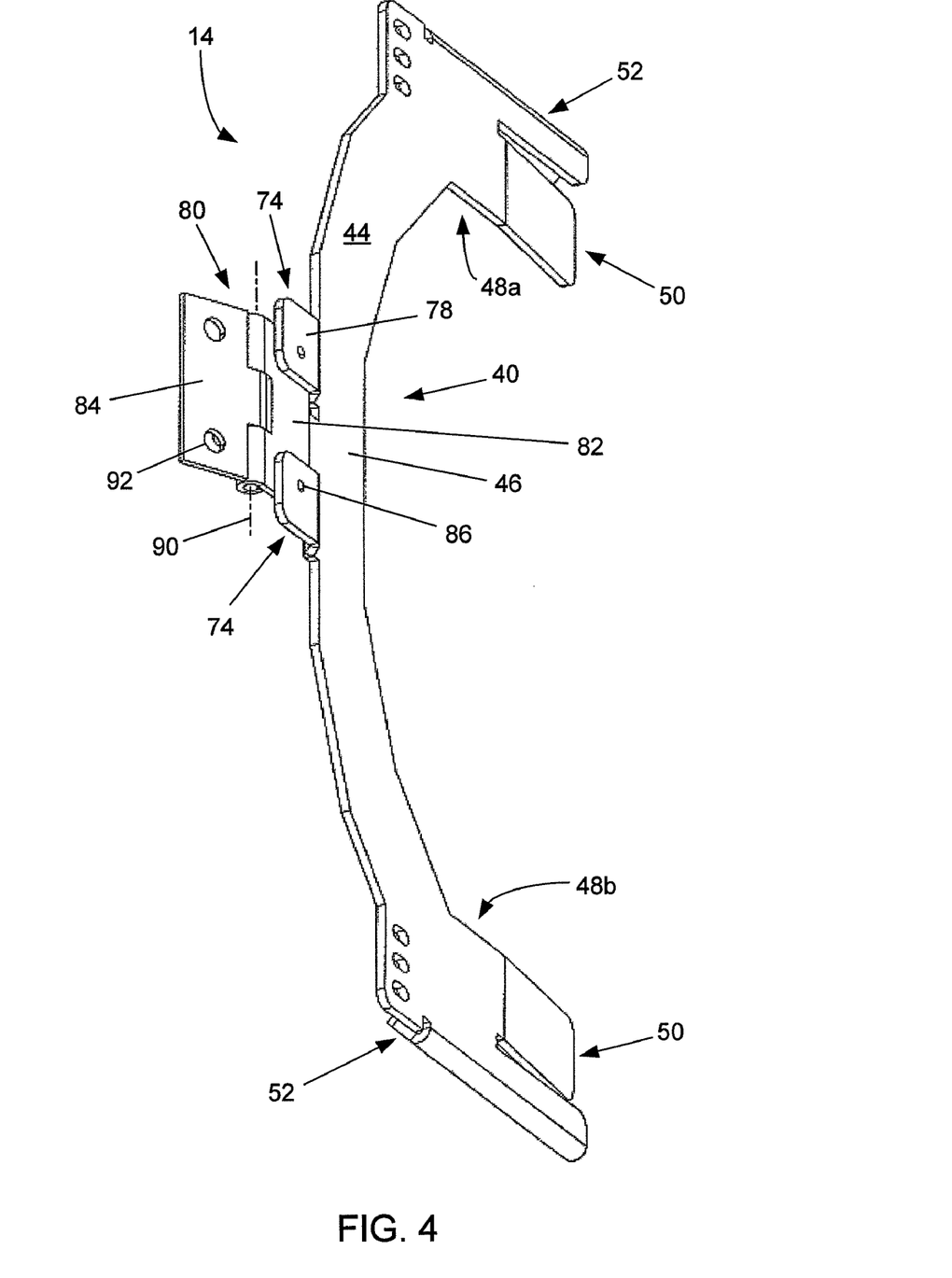
FIG. 4 is a perspective view of a back surface of the splice tray holder of FIG. 3.

The splice tray holder 14 includes a body, generally designated 40, having a front surface 42 and a back surface 44 (shown in FIG. 4). In the subject embodiment, the body 40 is generally U-shaped, although it will be understood that the scope of the present disclosure is not limited to the body 40 being generally U-shaped. The body 40 includes a central body portion 46, a first arm, generally designated 48a, and a second arm, generally designated 48b. The first and second arms 48a, 48b are disposed on opposite ends of the central body portion 46 and extend outwardly from the central body portion 46. In the subject embodiment, the first and second arms 48a, 48b are generally parallel. It will be understood, however, that the scope of the present disclosure is not limited to the first and second arms 48a, 48b being generally parallel.

In the subject embodiment, the first and second arms 48a, 48b are structurally similar. For ease of description purposes, the first and second arms 48a, 48b will be collectively referred to as the arm 48 in the singular or plural form as required by context. It will be understood, however, that the scope of the present disclosure is not limited to the first and second arms 48a, 48b being structurally similar.

In the subject embodiment, each of the arms 48 includes a spring portion, generally designated 50, and a retention portion, generally designated 52. In the subject embodiment, the spring portion 50 is a resilient tab that includes a base end 54 and a free end 56. The base end 54 of the resilient tab 50 is connectedly engaged with the arm 48 such that the resilient tab 50 and the arm 48 have a common edge 58. The free end 56 extends outwardly from the arm 48 such that the resilient tab 50 and the arm 48 form an angle α. In the subject embodiment, the angle α is in the range of about 175 degrees to less than 180 degrees. In a preferred embodiment, the angle α is about 177 degrees.

The retention portion 52 is connectedly engaged with the arm 48 at an outer periphery 60 of the arm 48. In the subject embodiment, the retention portion 52 is integrally connected with the arm 48 such that the arm 48 and the retention portion 52 share a common edge 62. The retention portion 52 includes an inner surface 64. The inner surface 64 of the retention portion 52 forms an oblique angle β with the front surface 42 of the arm 48. The oblique angle β formed by the retention portion 52 and the first arm 48a opens toward the second arm 48b while the oblique angle β formed by the retention portion 52 and the second arm 48b opens toward the first arm 48a. In the subject embodiment, and by way of example only, the oblique angle β is in the range of about 30 degrees to about 60 degrees. In another embodiment, the oblique angle β is in the range of about 40 degrees to about 50 degrees. In a preferred embodiment, the oblique angle β is about 45 degrees.

The retention portion 52 and the arm 48 cooperatively define a receiving groove 66 that extends the length of the retention portion 52. As the retention portion 52 and the arm 48 form the oblique angle β, the receiving groove 66 has a width that narrows as the receiving groove 66 approaches the outer periphery 60 of the arm 48 such that the receiving groove 66 is V-shaped.

The body 40 further includes a tray stop, generally designated 68. In the subject embodiment, the tray stop 68 includes a base portion 70 and a stop portion 72. The base portion 70 extends outwardly from the central body portion 46 of the body 40 in a direction that is generally opposite from the outwardly extending direction of the arms 48. In the subject embodiment, the base portion 70 of the tray stop 68 is generally planar with the front surface 42 of the body 40. The stop portion 72 extends outwardly from the base portion 70 in a direction that is generally perpendicular to the base portion 70. It will be understood, however, that the scope of the present disclosure is not limited to the stop portion 72 extending outwardly from the base portion 70 in a generally perpendicular direction.

Referring now to FIG. 4, the body 40 of the splice tray holder 14 includes a mounting plate, generally designated 74, that extends outwardly from the central body portion 46. In the subject embodiment, and by way of example only, there are two mounting plates 74. The mounting plate 74 includes a forward surface 76 (shown in FIG. 3) and a rearward surface 78 with both the forward and rearward surfaces 76, 78 being generally planar and being offset from a backside of the base portion 70 of the tray stop 68. The mounting plate 74 is disposed on the splice tray holder 14 such that the forward surface 76 and the backside of the base portion 70 cooperatively define a gap. The gap defined by the forward surface 76 of the mounting plate 74 and the backside of the tray stop 68 is configured to receive a mount, generally designated 80. In the subject embodiment, the mount 80 is a hinge having a first hinge component 82 and a second hinge component 84. It will be understood, however, that the scope of the present disclosure is not limited to the mount 80 being a hinge.

The mounting plate 74 further includes a mount opening 86 that extends through the mounting plate 74. The mount opening 86 is disposed on the mounting plate 74 such that the mount opening 86 is aligned with a thru-hole 88 (shown in FIG. 3) in the first hinge component 82 when the first hinge component 82 is inserted into the gap. In one embodiment, fasteners (i.e., bolts, screws, rivets, etc.) can be used to couple the first hinge component 82 to the mounting plate 74. In another embodiment, the hinge 80 can be coupled to the mounting plate 74 by a tight fit engagement resulting from the gap being slightly smaller than the thickness of the first hinge component 82.

The second hinge component 84 of the hinge 80 is connected with the first hinge component 82 such that the second hinge component 84 pivots about an axis 90. The second hinge component 84 includes thru-mounts 92. The second hinge component 84 is connected to the chassis 12 through a plurality of fasteners (i.e., bolts, screws, rivets, etc.), which are inserted through thru-mounts 92 in the second hinge component 84 and connectedly engaged with the chassis 12.

In use, the splice tray holder 14 is connectedly engaged to the chassis 12. The splice tray 16 is inserted into the splice tray holder 14 by aligning an outer edge 94 (shown in FIG. 2) of the tray base 26 with the receiving groove 66 of the retention portion 52 of the splice tray holder 14 such that second surface 29 of the tray base 26 of the splice tray 16 faces the front surface 42 of the splice tray holder 14. With the outer edge 94 of the splice tray 16 aligned with the receiving groove 66 of the splice tray holder 14, the splice tray 16 is inserted into the splice tray holder 14 such that the splice tray 16 advances toward the tray stop 68 until the outer edge 94 of the splice tray 16 abuts the stop portion 72 of the tray stop 68 of the splice tray holder 14. In one embodiment, the splice tray 16 is pushed into splice tray holder 14 such that the outer edge 94 of the splice tray 16 enters the receiving groove 66 of the splice tray holder 14 and slides within the receiving groove 66. In another embodiment, the splice tray 16 is rotated about a central axis X-X (shown in FIG. 2) of the splice tray 16 thereby advancing the splice tray 16 toward the tray stop 68.

To remove the splice tray 16 from the splice tray holder 14, the splice tray 16 is pulled from the splice tray holder 14 until the outer edge 94 of the splice tray 16 is disengaged with the receiving groove 66 of the splice tray holder 14. In another embodiment, the splice tray 16 is rotated about the central axis X-X of the splice tray 16 in a direction opposite to the insertion direction such that the splice tray 16 retreats from the tray stop 68 of the splice tray holder 14. In this embodiment, as the splice tray 16 rotates and retreats from the tray stop 68, fiber optic cable that is coiled around the spool 30 uncoils thereby allowing the splice tray 16 to be removed from the splice tray holder 14 while still maintaining optical connection with the fiber optic cable.

The splice tray holder 14 frictionally engages the splice tray 16 so as to prevent the splice tray 16 from being inadvertently disengaged from the splice tray holder 14. The frictional engagement is cooperatively provided by the spring portion 50 and the retention portion 52 of the splice tray holder 14. As the splice tray 16 is inserted into the receiving groove 66 of the splice tray holder 14, the spring portion 50 engages the second surface 29 of the splice tray 16 and biases the splice tray 16 away from the front surface 42 of the splice tray holder 14. As the spring portion 50 biases the splice tray 16 outwardly from the front surface 42, the peripheral edge portion 32 of the tray base 26 engages the inner surface 64 of the retention portion 52. This engagement of the second surface 29 of the splice tray 16 with the spring portion 50 of the splice tray holder 14 and the peripheral edge portion 32 of the splice tray 16 with the inner surface 64 of the retention portion 52 provide a frictional resistance that retains the splice tray 16 in the splice tray holder 14. This frictional resistance can be varied by increasing or decreasing the angle α and/or the oblique angle β. For example, if the angle α were increased to a value approaching 180 degrees, the biasing force of the spring portion 50 of the slice tray holder 14 would decrease. Similarly, if the oblique angle β were increased to a value approaching 90 degrees, the biasing force of the spring portion 50 would also decrease. Therefore, by adjusting either the angle α or the oblique angle β, the frictional engagement between the splice tray 16 and the splice tray holder 14 can be increased or decreased.

The frictional engagement between the splice tray holder 14 and the splice tray 16 reduces the risk of inadvertently removing a splice tray 16 when working with an adjacent splice tray 16. In addition, the frictional engagement between the splice tray holder 14 and the splice tray 16 reduces the risk of movement of splice trays 16 in the splice tray holders 14 during shipping or installation of the chassis 12 in an enclosure.

Figure 5:
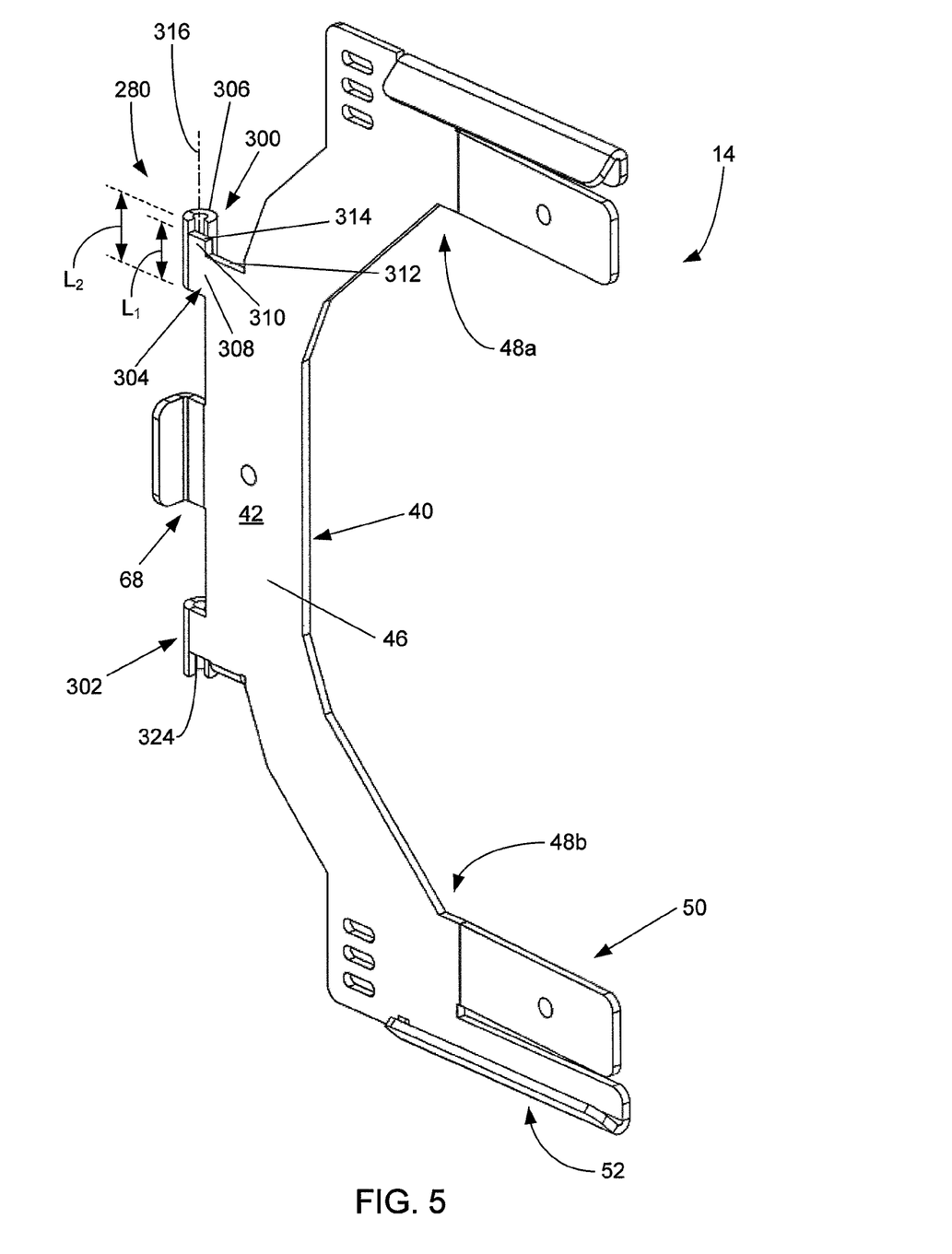
FIG. 5 is a perspective view of an alternate embodiment of a splice tray holder having features that are examples of aspects in accordance with the principles of the present disclosure.

Referring now to FIG. 5, an alternate embodiment of a mount, generally designated 280, for the splice tray holder 14 is shown. The mount 280 includes a first member, generally designated 300, and a second member, generally designated 302. In the subject embodiment, the first and second members 300, 302 of the mount 280 are integral with the body 40 and extend outwardly from the central body portion 46 in a direction that is generally opposite from the outwardly extending direction of the arms 48.

The first member 300 includes a keyed portion 304 and a rolled portion 306. In the subject embodiment, the keyed portion 304 includes a body segment 308 and a key 310. The body segment 308 extends outwardly from the central body portion 46 and includes a side surface 312.

The key 310 extends outwardly from the side surface 312 of the body segment 308 in a direction that is generally perpendicular to the body segment 308. In the subject embodiment, the key 310 and the body segment 308 are generally planar. It will be understood, however, that the scope of the present disclosure is not limited to the key 310 and the body segment 308 being generally planar. The key 310 includes an end surface 314. In the subject embodiment, the end surface 314 is generally parallel to the side surface 312 of the body segment 308.

The rolled portion 306 is in connected engagement with the body segment 308 and the key 310 such that the key 310 is adjacently disposed to the rolled portion 306. In the subject embodiment, the rolled portion 306 is integrally connected with the body segment 308 and the key 310. The material of the rolled portion 306 is rolled about a center axis 316. In the subject embodiment, and by way of example only, the material of the rolled portion 306 is rolled about 270 degrees around the center axis 316 such that the rolled portion is partially cylindrical in shape.

The keyed portion 304 has a length $L_1$ while the rolled portion 306 has a length $L_2$. In the subject embodiment, the length L1 of the keyed portion 304 is smaller than the length $L_2$ of the rolled portion 306.

Figure 6:
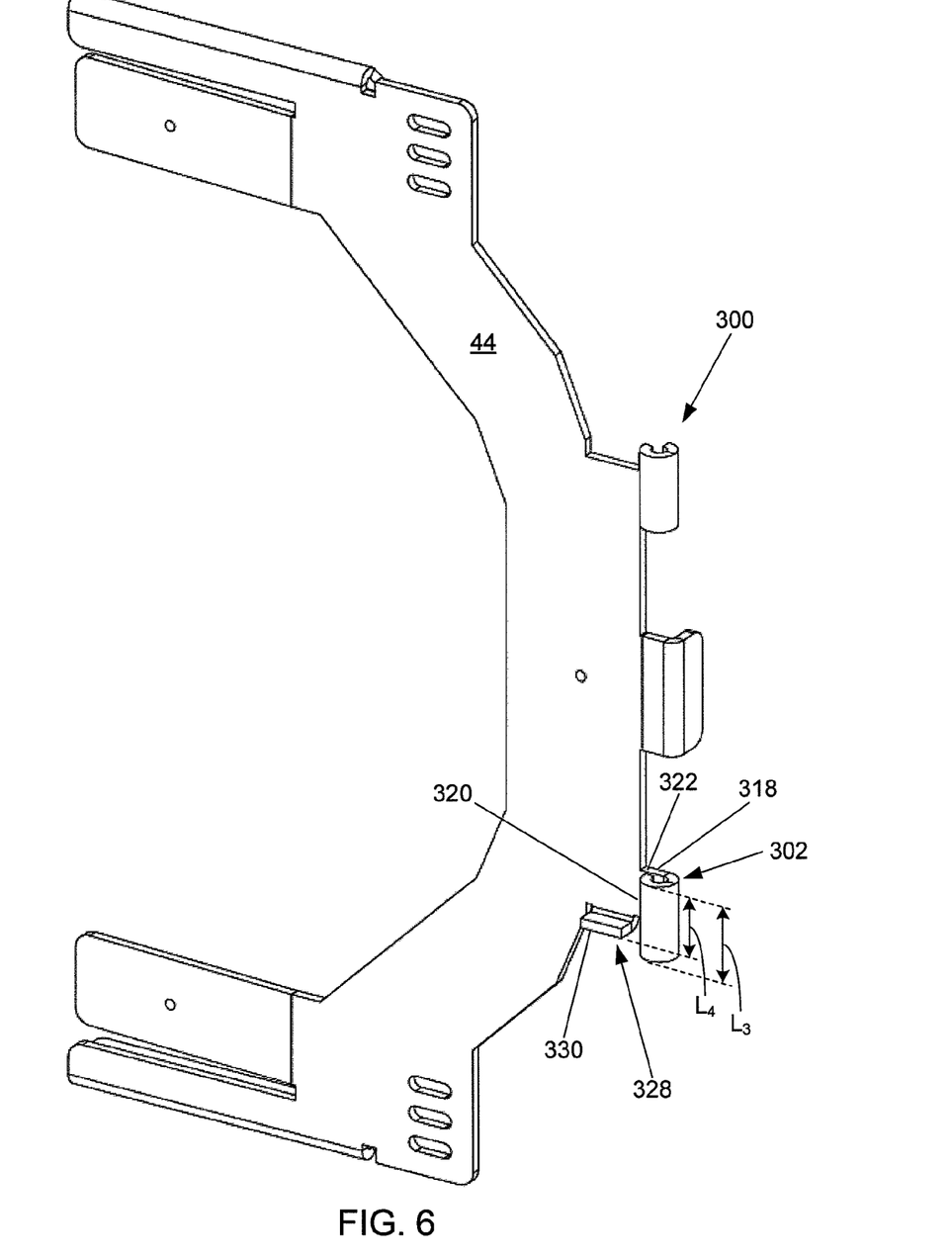
FIG. 6 is a perspective view of a back surface of the splice tray holder of FIG. 5.

Referring now to FIG. 6, the second member 302 of the mount 280 will be described. The second member 302 includes a body portion 318 and a cylindrical portion 320. The body portion 318 extends outwardly from the body 40 in a direction that is generally parallel to the extension direction of the base portion 70 of the tray stop 68. In the subject embodiment, the body portion 318 and the central body portion 46 are generally planar. It will be understood, however, that the scope of the present disclosure is not limited to the body portion 318 and the central body portion 46 being generally planar. The body portion 318 includes an upper side 322 and an oppositely disposed lower side 324 (shown in FIG. 5). In the subject embodiment, the upper side 322 and the lower side 324 are generally parallel.

The cylindrical portion 320 is in connected engagement with the body portion 318. In the subject embodiment, the cylindrical portion 320 is integrally connected with the body portion 318. The material of the cylindrical portion 320 is rolled about an axis 326. In the subject embodiment, and by way of example only, the material of the cylindrical portion 320 is rolled about 270 degrees around the axis 326 such that the cylindrical portion is partially cylindrical in shape. In the subject embodiment, the cylindrical portion 320 extends a length $L_3$ from the upper side 322 of the body portion 318 such that the cylindrical portion 320 extends beyond the lower side 324.

In the subject embodiment, the second member 302 of the mount 280 also includes a tab 328. The tab 328 is disposed on the lower side 324 of the body portion 318 and extends outwardly from the body portion 318. In the subject embodiment, the tab 328 extends outwardly from the body portion 318 in a direction that is generally perpendicular to the back surface 44. The tab 328 includes a lower surface 330. In the subject embodiment, the lower surface 330 is generally planar and perpendicular to the body 40 of the splice tray holder 14. The lower surface 330 of the tab 328 is disposed a distance $L_4$ from the upper side 322 of the body portion 318. In the subject embodiment, the length $L_4$ is less than the length $L_3$.

Figure 7:
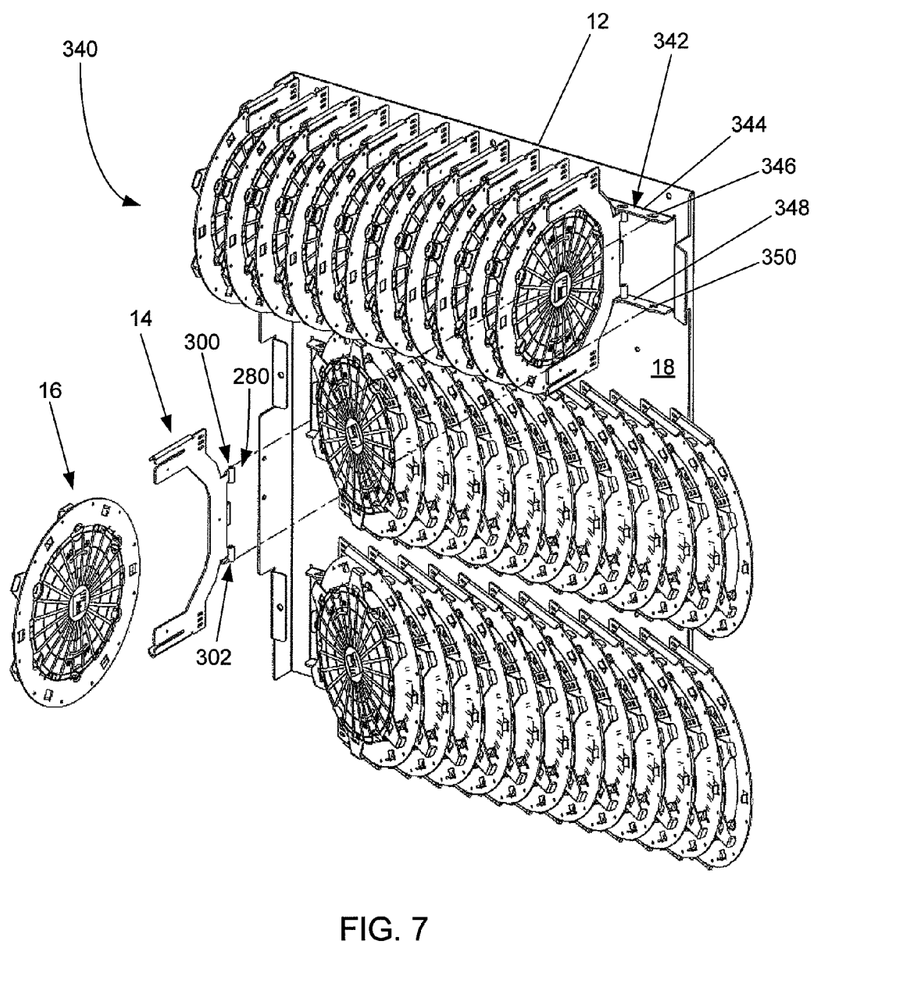
FIG. 7 is a perspective view of an alternate embodiment of the cable storage system of FIG. 1.

Referring now to FIG. 7, an alternate embodiment of a cable storage system, generally designated 340, is shown. It will be understood that directional references (i.e., right, left, etc.) that are used to describe the exemplary embodiment of the cable storage system 340 are made with regard to the orientation shown in FIG. 7 and such directional references are not intended to be limiting.

The cable storage system 340 includes the chassis 12, the splice tray holder 14, and the splice tray 16. The chassis 12 includes the base 18 and a plurality of brackets 342 that are connectedly engaged with the base 18. Each of the brackets 342 includes a first rail 344 having a plurality of first mount openings 346 and a second rail 348 having a plurality of second mount openings 350. The first and second mount openings 346, 350 are generally aligned such that each first mount opening 346 is positioned above a corresponding second mount opening 350. The first mount openings 346 are adapted to receive the first member 300 of the mounts 280 of the splice tray holders 14 while the second mount openings 350 are adapted to receive the second members 302 of the mounts 280. The first mount opening 346 defines a notch 352 that is adapted to selectively receive the key 310 of the first member 300 of the splice tray holder 14. In the subject embodiment, the notch 352 is a rectangular shape opening that extends radially outward from the first mount opening 346.

Figure 8:
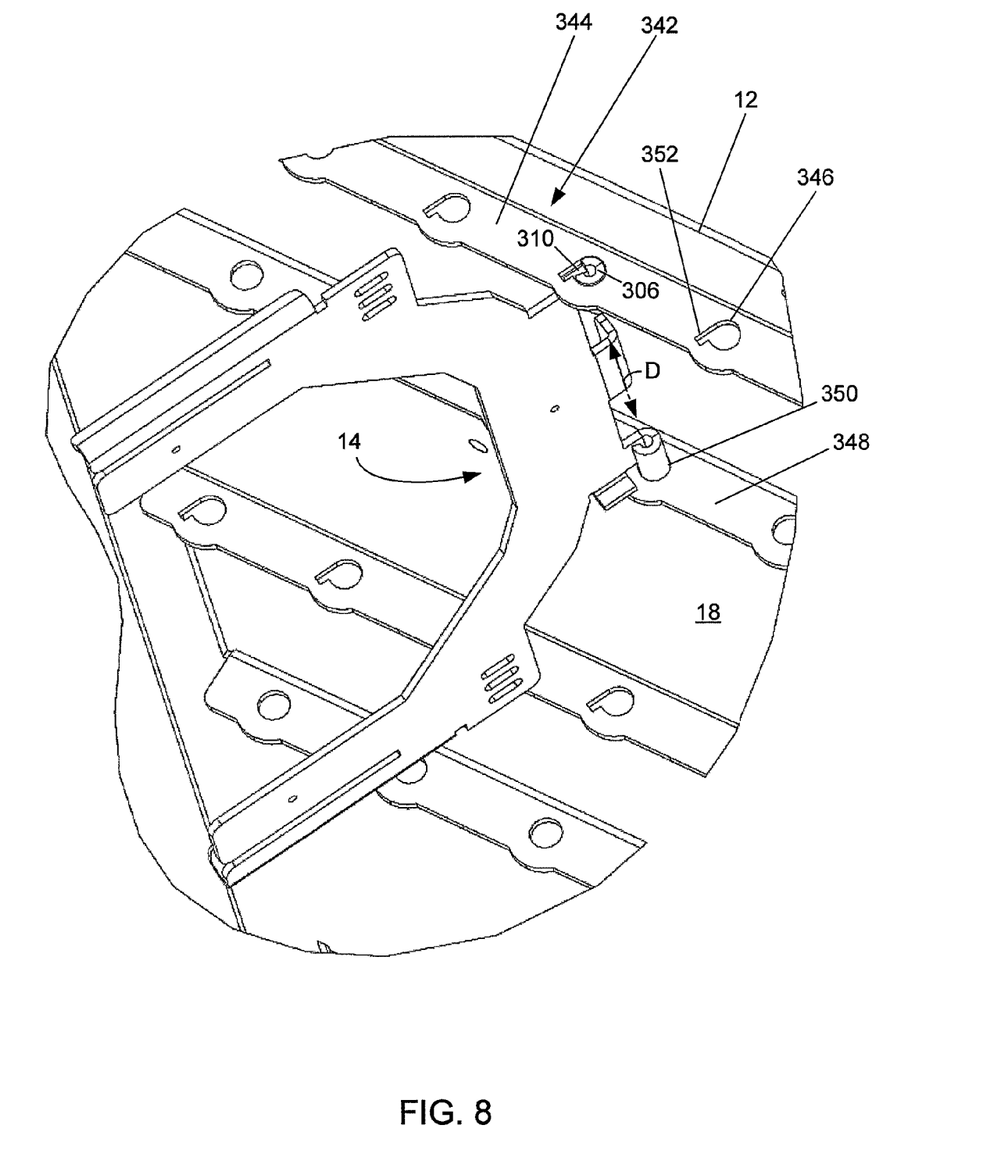
FIG. 8 is a enlarged fragmentary perspective view of the cable storage system of FIG. 7.

Referring now to FIGS. 5, 6, and 8, a method for inserting the splice tray holder 14 into the bracket 342 of the chassis 12 will be described. The rolled portion 306 of the first member 300 is inserted into the first mount opening 346 on the first rail 344 of the bracket 342. With the rolled portion 306 of the first member 300 inserted in the first mount opening 346, the splice tray holder 14 is then pivoted about the center axis 316 of the first member 300 until the key 310 is aligned with the notch 352 in the first mount opening 346. The splice tray holder 14 is then lifted in a direction D (shown in FIG. 8 as a dashed line) such that the rolled portion 306 of the first member 300 extends through the first mount opening 346 and the key 310 extends through the notch 352.

With the key 310 extending through the notch 352, the cylindrical portion 320 of the second member 302 is aligned with the second mount opening 350. The splice tray holder 14 is then lowered in the direction D such that the cylindrical portion 320 of the second member 302 engages the second mount opening 350. The splice tray holder 14 is lowered until the lower surface 330 of the tab 328, which is disposed adjacent to the second member 302, engages the second rail 348 of the bracket 342. The splice tray holder 14 is retained in the bracket 342 by the engagement of the first and second members 300, 302 with the first and second mount openings 346, 350. With the tab 328 resting on the second rail 348 of the bracket, a length of the second member 302 is engaged in the second mount opening 350. In the subject embodiment, that length is equal to $L_3$ minus $L_4$. A length of the first member 300 is engaged in the first mount opening 346. In the subject embodiment, that length is less than or equal to $L_2$ minus $L_1$.

Referring now to FIG. 7, the splice tray holder 14 can pivot about the center axis 316 of the first member 300 with the first and second members 300, 302 on the splice tray holder 14 engaged with the first and second mount openings 346, 350, respectively, on the bracket 342. In the subject embodiment, each of the splice tray holders 14 can be pivoted to an open position (shown in the top row of splice tray holders 14 in FIG. 7) and to a right collapsed position (shown in the bottom two rows of splice tray holders 14 in FIG. 7) or a left collapsed position.

The open position provides convenient access to the splice trays 16 within the splice tray holders 14. For example, if one splice tray 16 needs to be removed, the splice tray holder 14 associated with that splice tray 16 can be isolated from the other splice tray holders 14 by positioning the surrounding splice tray holders 14 in either the right or left collapsed positions and the splice tray holder 14 with the splice tray to be removed or inserted in the open position.

The collapsed position provides for a compact configuration of splice tray holders 14 on the chassis 12. This compact configuration provides for a greater density of splice tray holders 14 in the chassis 12.

Figure 9:
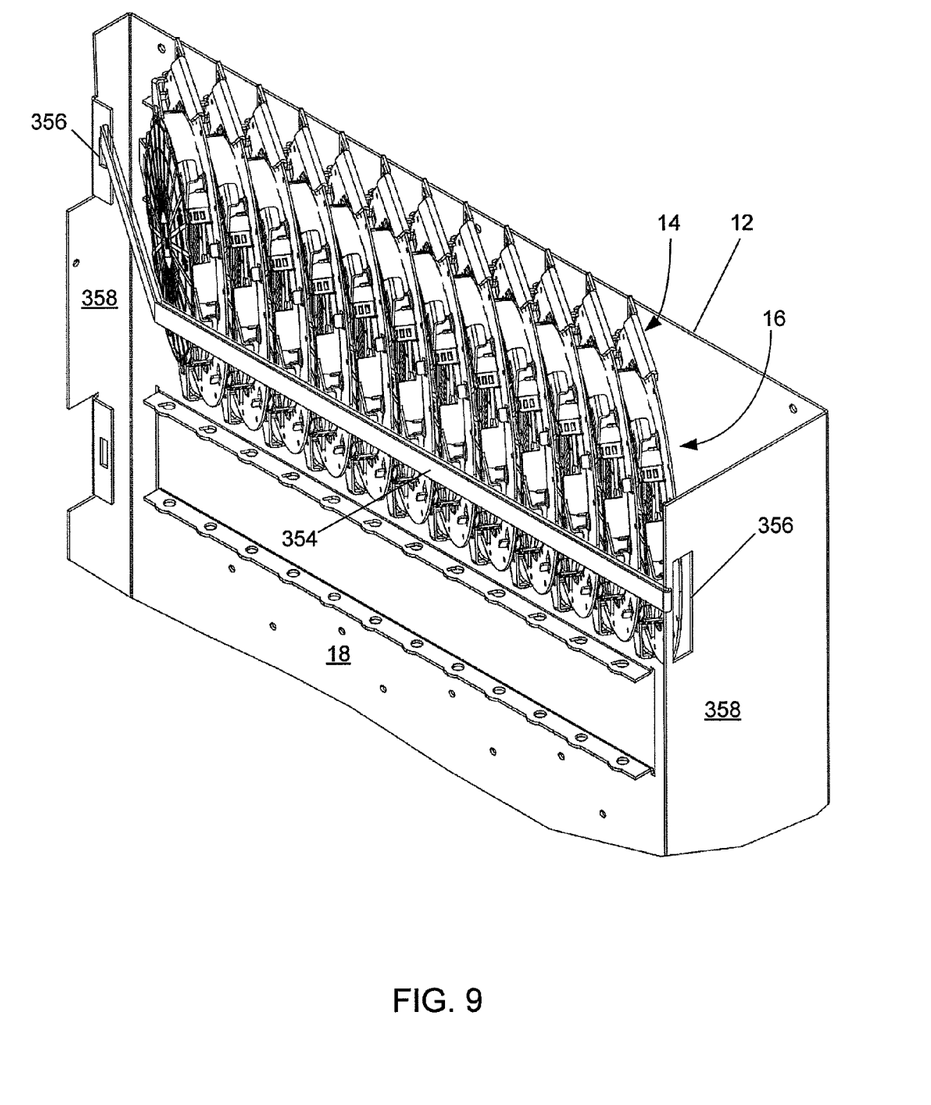
FIG. 9 is a perspective view of a holding member suitable for use with the cable storage systems of FIGS. 1 and 7.

Referring now to FIG. 9, a holding member 354 is shown for holding the splice tray holders 14 and the splice trays 16 in the collapsed position. In the subject embodiment, the holding member 354 is a flexible strap (i.e., fabric, rubber, etc.). It will be understood, however, that the scope of the present disclosure is not limited to the holding member 354 being a flexible strap. In the subject embodiment, and by way of example only, the holding member 354 is a hook and latch type flexible strap.

The holding member 354 is selectively engaged with the chassis 12. The holding member 354 is engaged with the chassis 12 through strap openings 356 disposed on opposite ends of the base 18 of the chassis 12. In the subject embodiment, the strap openings 356 are disposed on sidewalls 358 of the chassis 12. However, it will be understood, that the scope of the present disclosure is not limited to the strap openings 356 being on the sidewalls 358.

With the splice tray holders 14 and splice trays 16 in the collapsed position, one end of the holding member 354 is looped through one of the strap openings 356 while the other end of the holding member 354 is looped through the other of the strap openings 356 such that the holding member 354 spans across the collapsed splice tray holders 14 and splice trays 16. The ends of the holding member 354 are then connectedly engaged to each other so as to secure the splice tray holders 14 and splice trays 16 in the collapsed position.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A splice tray holder comprising:
    a body having a first portion, a second portion, and a front surface;
    a retention portion disposed on an outer periphery of each of the first and second portions and defining a receiving groove having an inner surface that faces toward the front surface of the body; and
    a spring portion disposed on each of the first and second portions, wherein the spring portion is adapted to provide a biasing force in a direction from the front surface of the body toward the inner surface of the receiving groove.

2. A splice tray holder as claimed in claim 1, wherein the spring portion is a resilient tab having a base end and a free end with the base end being connectedly engaged with the body.

3. A splice tray holder as claimed in claim 2, wherein the free end and the front surface of the body define an oblique angle in a range of about 175 degrees to less than 180 degrees.

4. A splice tray holder as claimed in claim 1, wherein the first portion of the body is a first arm that extends outwardly from a central body portion and the second portion of the body is a second arm that extends outwardly from the central body portion.

5. A splice tray holder as claimed in claim 1, wherein the retention portion is integral with the body.

6. A splice tray holder as claimed in claim 1, wherein a width of the receiving groove narrows as the receiving groove approaches the outer periphery of the retention portion.

7. A splice tray holder as claimed in claim 1, further comprising a tray stop that extends outwardly from the body, wherein the tray stop includes a stop portion.

8. A method for inserting a splice tray into a splice tray holder comprising the steps of:
    aligning an outer edge of a splice tray with a receiving groove of a retention portion of a splice tray holder;
    inserting the outer edge of the splice tray into the receiving groove of the splice tray holder such that a spring portion of the splice tray holder biases the splice tray toward a surface of the receiving groove; and
    advancing the splice tray in the splice tray holder.

9. A method for inserting a splice tray into a splice tray holder as claimed in claim 8, wherein the outer edge of the splice tray slidingly engages the receiving groove of the splice tray holder.

10. A splice tray holder comprising:
    a body having a front surface;
    at least one retention portion disposed on the body and defining a receiving groove having an inner surface that faces toward the front surface of the body; and
    at least one spring portion disposed on the body, wherein the spring portion is adapted to provide a biasing force in a direction from the front surface of the body toward the inner surface of the receiving groove.

\* \* \* \* \*